US006763925B2

(12) United States Patent
Woods

(10) Patent No.: US 6,763,925 B2
(45) Date of Patent: Jul. 20, 2004

(54) SELF PROPELLED BACKFILLING APPARATUS

(76) Inventor: James Woods, 2115 La Mirada Dr., Vista, CA (US) 92083

(*) Notice: Subject to any disclaimer, the term of this patent is extended or adjusted under 35 U.S.C. 154(b) by 20 days.

(21) Appl. No.: 09/978,338

(22) Filed: Oct. 15, 2001

(65) Prior Publication Data
US 2002/0060125 A1 May 23, 2002

Related U.S. Application Data

(63) Continuation-in-part of application No. 09/498,712, filed on Feb. 7, 2000, now Pat. No. 6,302,257.

(51) Int. Cl.[7] ............................................. B65G 41/00
(52) U.S. Cl. ..................... 198/311; 198/313; 198/569; 198/536; 414/523; 414/528; 405/179
(58) Field of Search ..................... 198/311, 313–315, 198/535, 536, 544, 547, 550.2, 569, 565; 414/488, 489, 503, 505, 523, 528, 469; 405/179

(56) References Cited

U.S. PATENT DOCUMENTS 1,220,249 A * 3/1917 McWhorter ................. 198/569
3,198,495 A * 8/1965 Maxon ........................ 414/469
3,598,224 A * 8/1971 Oury ........................... 198/311
6,283,697 B1 * 9/2001 Pierce et al. ................. 414/528
6,302,257 B1 * 10/2001 Woods ........................ 198/311
6,425,725 B1 * 7/2002 Ehlers ........................ 414/523

* cited by examiner

Primary Examiner—Joseph Valenza
(74) Attorney, Agent, or Firm—Donn K. Harms

(57) ABSTRACT

A self propelled vehicle for transport and placement of an onboard supply of fill material in an onboard hopper. The hopper is connected to said vehicle at a point operatively positioned to discharge fill material placed therein on a conveyor belt mounted to a support structure. The fill material is deposited on the conveyor at a receiving and discharged at the distal end of the conveyor either directly or via a flow director attached to the distal end attached thereto. The flow director bifurcates the stream of fill material allowing the operator to place more or less of the fill in two streams using a plurality of independently adjustable channeling ramps. The hopper is optionally adjustable from an angle normal to the vehicle to allow for adjustment in the vehicle center of gravity on grades. The flow director can also be configured for attachment to existing conveyors to increase their utility or used as part of the entire self propelled device in a single unit. Optionally, the distal end of the conveyor may be elevated or lowered for proper positioning.

6 Claims, 3 Drawing Sheets

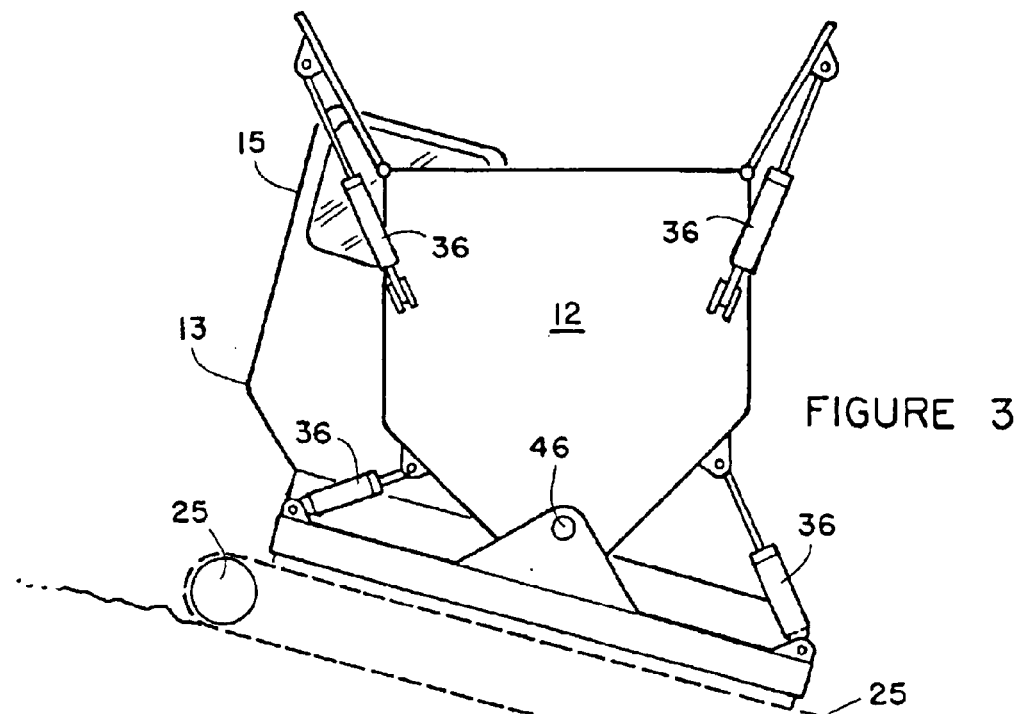
FIGURE 3
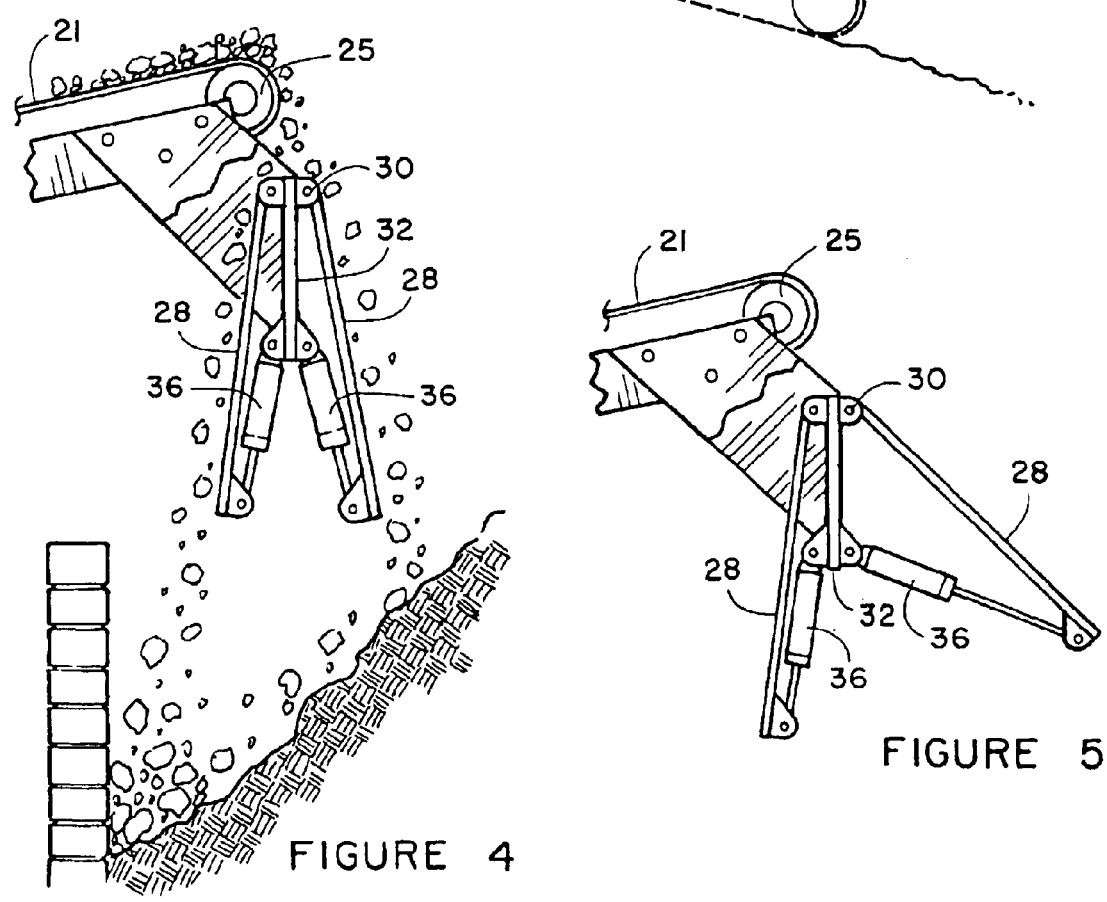
FIGURE 4
FIGURE 5

SELF PROPELLED BACKFILLING APPARATUS

This application is a continuation in part and claims the benefit of U.S. application Ser. No. 09/498,712 filed on Feb. 7, 2000 now U.S. Pat. No. 6,302,257.

BACKGROUND OF THE INVENTION

1. Field of the Invention

The present invention relates to heavy equipment used in construction. More particularly, it relates to large earth moving machinery used in trenching and pipeline construction and the device, as herein disclosed, provides extremely accurate user control over the placement of soil and other material used to cover buried pipelines and to backfill structures during heavy construction.

2. Prior Art

Construction projects involving the removal and replacement of soil have been ongoing for thousands of years. Inevitably, construction projects large and small require the exacting removal and repayment of soil in trenches, behind walls, and over pipelines and cables. Placing sand, stone or gravel in a tight area can be one of the most time-consuming and costly tasks at a construction job site. Material may need placement to exacting specifications especially when covering pipelines and other underground utilities. Additionally, there may be concerns about disturbing the surrounding environment by using heavy machinery to place aggregate materials, should those materials be misplaced by the machine operator. Careful placement of many fill materials is also a must in modern construction since many times pipes, tanks or other under slab materials are damaged using conventional backfilling.

Normally, the gravel, aggregate, soil, or other material to be used for the fill stream arrives and is dumped on the ground and is then loaded into a hopper of the machine which will deposit the fill where it is needed. Depending on the size and access available to the job site, this can take several men and machines many hours to complete. Not only is this an outdated process, but inefficient and costly to project owners and contractors. On large projects such as pipelines, many tons of fill material can be lost in the transferring process, as well as the risk of accidental placement of material improperly or in a fashion that actually damages the pipeline itself.

Consequently, there exists a need for an apparatus which will provide for the easy transport and placement of fill material constantly used in construction projects. Such a device should provide for the easy transportation of the material itself without excessive loss during transport. Additionally, such a device should provide the user an easy manner to place the material according to even the most exacting job specifications. Further, such a device should also allow the user to accurately place fill material while concurrently avoiding damage during the burying of pipelines, cables, and other infrastructure that is commonly buried. Finally, the device should maintain its own center of gravity to prevent tipping.

SUMMARY OF THE INVENTION

Applicants' device is an easily mounted and operated apparatus capable of use as a complete backfilling unit with material reservoir or hopper for storage and transport of fill material, a conveyor, and a fill material flow director. Or, in some instances, components of the device may be manufactured for mounting and use in combination with existing conveyer systems used in the placement of fill material. The device in the current best mode of a complete unit features a hopper for holding fill material such as gravel, sand, soil, or similar conventionally used materials. The hopper is mounted upon a chassis or support structure of a vehicle that is moveable by conventional wheel and axil or tread mounted systems of propulsion. A telescopic conveyer system is also mounted upon the chassis in a position to receive material from the hopper at one end and convey that material to the distal end for placement in trenches, behind wall, over pipelines, and in similar conventional positions in which fill is required.

In the best mode, at the distal end of the telescopic conveyor, a means for direction of the fill stream is provided by a flow director. However, the combination of the hopper which corrects its own center of gravity with the conveyor by itself is a vast improvement over current technology using a backhoe and dump truck full of dirt. In the best mode, the flow director is attached to the distal end of a conveyor means in this case depicted as a telescopic conveyor belt and constantly receives the fill material transported by the conveyor from the hopper of material on the device. As the conveyor is telescoped in or out, the flow director being attached to the distal end of the conveyor belt support structure is positionable by the machine operator to where fill is to be placed. Attached just below the point where the conveyer belt discharges the fill material carried upon the moving belt, this flow director is always positioned to receive the fill material from the hopper and transported by the conveyor.

The flow director features a pair of channeling ramps connected by an axil to a strut which communicates with the distal end of the support structure for the conveyor belt. The strut provides a mount for one end of each channeling ramp. The distal end of each channeling ramp is independently positionable to an infinite number of positions by a means for elevation of the channeling ramps in the form of a hydraulic ram. The hydraulic ram is controllable for elongation by the machine operator from the cab in the conventional fashion of such devices. The operator may elongate the ram to raise the attached channeling ramp to change the position of the distal end of the channeling ramp. By changing the position of one or both distal ends of both channeling ramps, the operator gains extremely precise control of the position in which the fill material is placed. Lowering both will provide a narrow but straight stream of material while raising both to the maximum will bifurcate the fill stream and place half of it on one side and the other half of the stream a distance from the first equal to the distance between the two distal ends of the pair of channeling ramps. Optionally, a swivel can be added to the strut allowing the operator to swivel the channeling ramp off the position parallel to the conveyor belt to allow for angled placement of fill.

Additional utility is provided by a means for altering the center of gravity of the hopper. This solves another vexing problem that exists with large machinery which in itself is heavy and becomes even heavier when carrying fill material. Such machines conventionally are prone to tip over when the machine encounters a grade. The means for altering the center of gravity of the hopper allows the user, or a computer, to adjust the angle of the hopper from a normal position in relation to the frame of the machine to an ever increasing angle, depending on the grade encountered and upon the weight of the fill placed in the hopper. In this case, by using an axil mount at the base of the hopper and a hydraulic ram to tilt the hopper one direction or the other, an infinite number of different positions may be established for the hopper and a resulting number of adjustments of the center of gravity of the assembled machine to traverse the grade encountered.

An object of this invention is providing an easily used and maintained apparatus which provides for extremely accurate placement of fill material on construction sites.

It is a further object of this invention to provide an easily manufactured and operated fill material channeling ramp that may be attached to conventional conveyors when needed as an attachment.

An additional object of this invention is to provide a device allowing for use on steep grades by the adjustment of the center of gravity of the load carried by the device during use.

A further object of this invention is to minimize the waste and misplacement of fill material during backfill and burying of pipelines and underground utilities.

Another object of this invention is to reduce the risk of damage to an infrastructure such as pipelines and other utilities during the burial phase of their construction.

Further objects of the invention will be brought out in the following part of the specification, wherein detailed description is for the purpose of fully disclosing the invention without placing limitations thereon.

BRIEF DESCRIPTION OF DRAWING FIGURES

FIG. 3 depicts a side view of the self powered vehicle on an incline with the hopper adjusted to change the vehicle center of gravity.

FIG. 4 is a side view of the conveyor with the channeling ramps in a retracted position for a narrow pour of the bifurcated material stream.

FIG. 5 depicts the independently adjustable channeling ramps in unequal positions to bifurcate the fluid stream unevenly.

DETAILED DESCRIPTION OF THE PREFERRED EMBODIMENTS OF THE INVENTION

Figure 1:
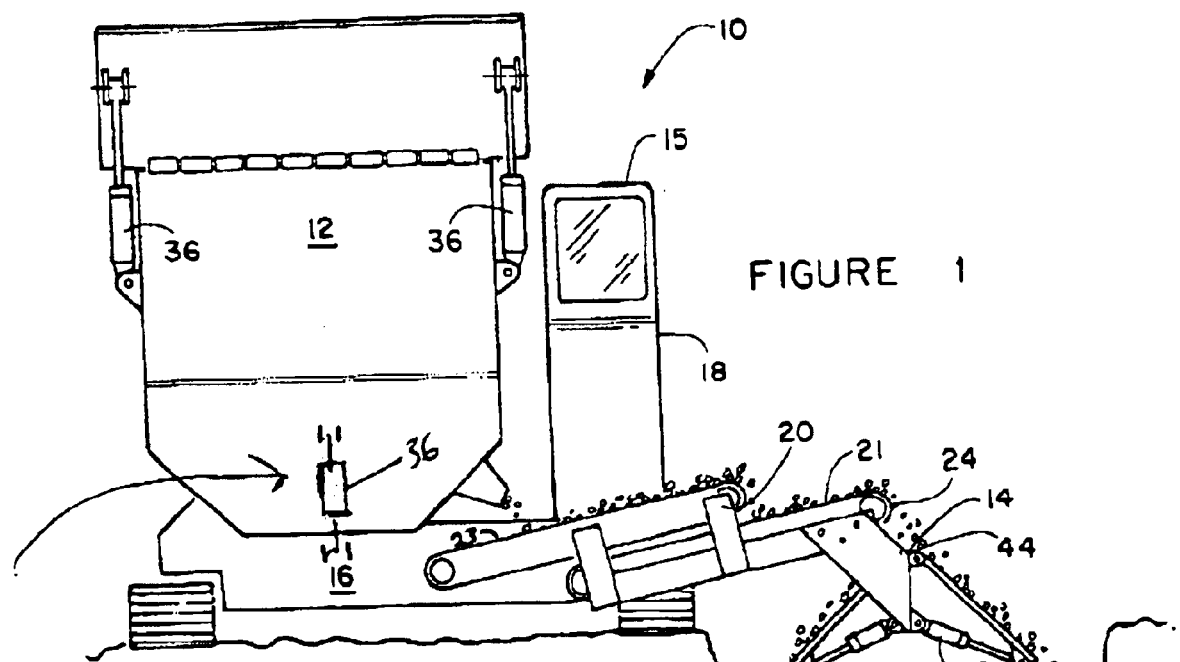
FIG. 1 is a side view of the device showing the fill material hopper mounted on a powered vehicle with the flow director attached at the distal end of a conveyor belt.
Figure 2:
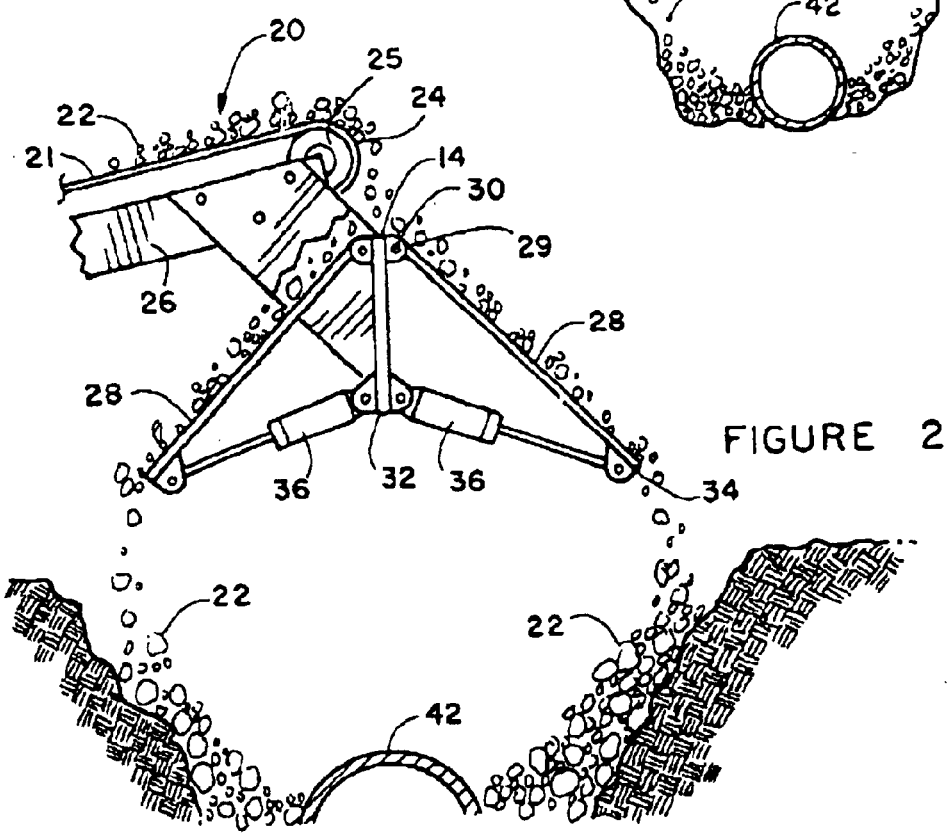
FIG. 2 is a side view of the flow director attached at the distal end of a conveyor belt depicting the two channeling ramps adjusted for placement of fill material.

Referring now to the drawing FIGS. 1–6 depict the various components and interrelation thereof in operation of the disclosed device 10. FIG. 1 depicts a side view of the device 10 as it would appear in operation as a complete unit. While it is anticipated that components of the device 10 can be manufactured as attachments to conventionally used back filling devices, the current best mode of the device 10 works best as a complete unit with a hopper 12 for holding and transporting fill material, a conveyor means such as the depicted telescopic conveyor 20, and a material stream flow director 14, functioning in a symbiotic relationship to each other.

The device 10 in the current best mode of a complete unit features a hopper 12 which is filled by the user with one or combinations of conventional fill materials such as gravel, sand, soil, or similar conventionally used materials. The hopper 12 is mounted upon an attachment point depicted in this case as the hopper axil 46 to the vehicle chassis 16 of a powered or self propelled vehicle 18. The self propelled vehicle 18 may be powered by conventional means for vehicle power such as gasoline or diesel engines which provide power via communicating hydraulic pumps or by drive shafts communicating the power to wheels and pump combinations or in other conventional means of powering a wheeled or treaded or similar such piece of construction equipment.

A conveyor means depicted by a telescopic conveyor 20 is also mounted upon the chassis 16 by a support structure 26 which defines the dimensions of the conveyor 20 built around it. The conveyor means could also be a fixed length conveyor but in the current best mode the conveyor means is a telescopic conveyor 20 and provides the most utility. This is because it is adjustable for positioning the distal end of the conveyor 20 and the flow of fill material 22 leaving that end, at the location desired for deposit of the material 22. Since the receiving point for the fill material 22 is generally in trenches, behind walls, over pipelines, on top of power lines, gas pipes, and other infrastructure utilities that are buried, adjustability in the form of the telescopic conveyer 20 provides the user greater adjustability for the flow of fill material 22 to the desired location. With more effort, a fixed length conveyor could also be used but the telescopic conveyor 20 is the current best mode.

The conveyer 20 works in the conventional manner of conveyer belt systems and transports fill material 22 communicated from the hopper 12 at the receiving end 23, and conveys that material 22 on a rotating belt 21 to the distal end 24 for placement in desired location. The belt would be powered by a conventional means for powering the rotation of the belt such as a hydraulicly powered motor or electric motor. At the distal end 24 of the conveyer 20 a means for adjustably bifurcating a communicated stream of fill material is provided by the flow director 14. The flow director is attached to the distal end 24 of the conveyor means in this case conveyor 20 in a position to constantly receive substantially all of the fill material 22 communicated by the conveyer 20 from receiving end 23 which receives fill from a discharge aperture 11 operatively position in the hopper 12. If mounted to the conveyor 20 which is of fixed length, the flow director 14 remains fixed in position relative to the ground attached to the distal end 24 of the conveyor 20. This would be acceptable in instances when access to the target for the fill stream is easily obtained and maintained. When mounted to the distal end 24 of a conveyor 20 that is telescopic, when the conveyer 20 is telescoped and laterally translates, the location in relation to the ground of the fill material flow director 14 is easily positionable by the machine operator over the target position where fill material 22 is to be placed. The flow director 14 would be attached to the support structure 26 for the conveyer 20 just below a point at the distal end 24 where the conveyor 20 discharges the fill material 22 which has been communicated by the conveyor belt from the discharge aperture 11 in the wall of the hopper 12.

The flow director 14 features a pair of channeling ramps 28 which are connected at a first end 29 of each of the ramps 28 by a ramp axil 30 in a position adjacent to the distal end 24 of the conveyor 20 at a strut 32 or other fixed member which is part of, or communicates with, the distal end 24 of the support structure 26 for the conveyer 20. As depicted in the current best mode, the strut 32 provides a mount for the first end of each channeling ramp 28 but other means of attachment to the distal end of the conveyor 20 are anticipated.

The distal end 34 of each channeling ramp 28 opposite the first ends attached at the ramp axil 30, are each independently positionable, to an infinite number of positions from their low point determined by the minimum length of the hydraulic ram 36, which rotates them on the ramp axil 30 as depicted in FIG. 4, and the high point of elevation of the distal ends 34 depicted in FIG. 4, as determined by the maximum extension of the ram 36, which rotates them on the ramp axil 30. The operator by elongating the ram 36 using conventional controls, may change the position of each of the two different distal ends 34 independently to adjust the landing point for the material stream discharged from that distal end 34. Changing the positions of the ramps 28 thus provides a means to direct each of two separated material streams to a separate individual target position below the distal end of said conveyor 20. This allows the user to take the bifurcated material stream and direct two separate streams of material to a bury a target to be covered on the ground, such as a pipe or trench, by a means for independent elevation of each of the channeling ramps 28 in the form of a hydraulic ram 36. Electric solenoids or rack and pinion gear mechanisms might also be used to provide the means for independent elevation of the channeling ramps 28, however, the current best mode uses hydraulic rams 36 since the majority of heavy equipment of this type are powered by on board hydraulic systems which also provide power for the conveyor 20 and self propulsion using treads 50 receiving power from a hydraulic motor. The hydraulic ram 36 is controllable for elongation and contraction by the machine operator from the cab of the powered vehicle 13 in the conventional fashion of such devices which have a laterally translatable arm moving in and out of a cylinder. The engine providing propulsion by powering the hydraulic pumps or electric motors would be operatively mounted to the chassis of the vehicle 13 in a position to allow operative communication with the control levers in the cab 15 which allow the operator to control the various functions powered by the engine. The operator may elongate the ram 36 to raise the attached channeling ramp 28 and thus change the position of the distal end 34 of the channeling ramps 28, or he can shorten the ram 36 to lower the ramps 28. Each ram 36 is independently adjustable to thereby swing the attached channeling ramp 28 on the ramp axil 30. The user can thus independently adjust the position from the low point or the center axis of trench or pipe or other item to be buried by adjustment of one or both distal ends 34 of both channeling ramps 28 from centerline between the low point of adjustment. The operator can thereby control the deposit position and quantity of fill material deposited from each of the two parts of the bifurcated stream of fill material 22 being split. This individual adjustment of quantity of fill material so deposited provides the operator extremely precise control of the position and quantity at which the fill material 22 communicated to the flow director 14 by the conveyor 20 is placed. Lowering both channeling ramps 28 to the low point where the distal ends of each channeling ramp are substantially adjacent to each other will move the distal ends of the channeling ramps 28 over to the center axis of the trench or pipe or other item being buried, and provide a narrow but straight directional stream of fill material 22 to a single point. Conversely, raising both channeling ramps 28 to the highpoint or maximum position essentially perpendicular to the center axis of the pipe or trench, will move the distal ends of the channeling ramps further away from the center line and will bifurcate the communicated stream of fill material 22 to a maximum distance from center line of the trench, pipe, or other object being covered with fill.

Adjusting the angles of the ramps 28 also provide a means adjustably bifurcating the volume of the two separate streams of fill material and thereby allows the operator to place a defined amount of fill material 22 in one location at the narrowest point of separation of the distal ends, or defined amounts of the communicated fill material 22 in two different target locations. Since both of the channeling ramps 28 are independently adjustable, there is an infinite number of positions for the distal ends 34 of the channeling ramps 28 in relation to each other and the center line of the object being buried by the fill material thus allowing for an infinite number of adjustments of the quantity, as well as the target location of each section the streams of fill material being deposited. Further means of adjustingly bifurcating the amounts of each of the two streams of fill material being deposited is accomplished by using remote controls for slowing, or speeding the rate of forward speed of the belt 21 toward the distal end of the conveyor 20. By adjusting the motor that runs the conveyor and thus the speed of the conveyor belt 21 the amount of fill material deposited on one or the other of the channeling ramps 28 can also be adjusted. This results because a faster speed of the belt 21 conveyer 20 will produce more inertia on the fill material and naturally cause more material to be deposited further away from the conveyer distal end 24 causing more fill material 22 to deposit on the outer channeling ramp 28. Conversely slowing the speed of the conveyer 20 will cause an equal distribution to each of the pair of channeling ramps 28 with an even slower belt speed causing more material to deposit on the closest of the ramps to the distal end of the conveyor 20, and less on the outer channeling ramp 28.

Since the flow of material can also be adjusted by resistance provided by gravity in relation to the upward angle on the channeling ramps 28, the user can also adjust the flow and volume of the two separate streams of material 22 by increasing or decreasing the downward angle of the channeling ramps 28 in relation to a position normal to the angle of the conveyor 20. A steeper angle will cause less back pressure on the steam of fill material falling onto the ramps 28 causing a faster fall and more material flowing down that ramp. A less steep angle will cause the material to stay upon the channeling ramps 28 slightly longer due to friction caused by gravity on the fill and thereby cause back pressure in the flow of the material resulting in less material reaching the designated position. By adjusting the channeling ramps 28 to different individual angles, the operator can precisely deposit more or less fill material to the desired target from each of the channeling ramps 28 causing more fill material to be deposited from one ramp 28 than the opposite ramp 28. Combinations of these different means for adjustingly bifurcating the flow and thus the volume of deposited fill material can be achieved by combining one or combinations of the aforementioned speed control of the conveyor 20 and the angle of the channeling ramps 27 and 28.

This ability to deposit fill material precisely on target and in precise volume, is especially important in the backfill operation involving pipelines and other trench buried infrastructures. The aforementioned means for adjustably bifurcating the stream of fill material, and the means to direct each of the two separated material streams to an individual target position below said distal end of said conveyor allow increased precision as depicted in FIGS. 2–5. As depicted, each of the channeling ramps 27 and 28 have been adjusted to a downward angle to yield the precise volume of material 22 to be deposited in the precise target position on below the distal end of the conveyor 20 on either side of the centerline of the trench being filled, or, on adjacent sides of an object such as a pipeline 42 or in a back fill of a wall 48 or in other targeted positions for the separated fill streams. By adjusting the position of the flow director 14 by laterally translating the telescopic conveyor 20 and adjusting the angles and elevation of the individual channeling ramps 28 appropriately, the operator avoids damage to the pipe 42 which could be caused by dropping fill material from the conveyor 20 directly onto the pipe 42 or onto the pipe 42 at the wrong angle or from the wrong elevation. The ability to adjust each channeling ramp 28 independently of the other as depicted in FIG. 4, allows the operator to deposit an exact volume of material 22 on each side of the pipe 42 to bury and protect it. Individual adjustment of the channeling ramps 28 to equal or differing distances from a center line allows more or less fill material to be deposited by one or the other of the channeling ramps 28 on either side of a target.

Additional means for steering the placement of fill material is provided the operator by a control allowing the operator to change the speed of the conveyor 20 or the angle of one or both of the channeling ramps 28 and the position of the flow director over the target to be buried, all at the same time. This allows the operator a constant ability and means of steering the placement of the fill material 22 as well as a means for determining the volume of material 22 placed in one or a plurality of positions of the two separate material streams.

The conveyor 20 if powered by conventional hydraulic systems which as noted above can be sped up or slowed in the conventional fashion using levers to change the flow rate of the hydraulic fluid powering the motors 25. Or, if an electric motor is instead used as a means to rotate the conveyor belt 21 on the conveyor 20 its speed can be increased or decreased in a conventional manner using electrical controls such as a potentiometer to control the speed of the electric motor which would communicate power to the belt 20 to rotate it.

Optionally, additional means for adjustment of the placement of the bifurcated material stream may be provided by a swivel 44 at the attachment point of the flow director 14 to the distal end of the conveyor 20. Such an option would allow the operator to swivel the channeling ramps 28 to positions off the position parallel to the conveyor 20 to allow for angled placement of fill 22 discharged by the distal ends of the channeling ramps 28. The swivel 44 can be hydraulically driven by a hydraulic motor 25 or gear driven, or electrically driven, in the aforementioned conventional manner of powering such construction equipment.

Additional utility is provided by an optional means for altering the center of gravity of the hopper 12. This ability to adjust the massive weight imparted to the vehicle 12 by the load of fill material 22 deposited in the hopper 12 solves another vexing problem that exists with large machinery. Such machines, due to their mass and odd center of gravity caused by irregular shape and operational configurations, are prone to tip over when the machine encounters a steep grade. The means for altering the center of gravity of the hopper 12 allows the user, or a computer, to adjust the angle of the hopper 12 from normal to the vehicle 13 frame to a better angle, depending on the grade encountered and upon the weight of the fill 22 placed in the hopper 12.

As depicted in FIG. 3, a means for adjustment of the vehicle center of gravity is provided by the hopper being attached to the vehicle chassis at an attachment point having a hopper axil 46 which rotationally attaches the hopper 12 to the chassis 16 of the powered vehicle 13. The axil 46 is situated at the base of the hopper 12 thus allowing the entire hopper 12 to rotate on the axil 46 at the connection point to the vehicle 13. A means to tilt the hopper 12 which in this case is a hydraulic ram 36 of the same operation as mentioned above. However, other devices such as rack and pinion gearing, or electric solenoids could be used if desired or on vehicles so powered.

The operator, or a computer, tracking the incline traversed by the vehicle 13 and the mass of the fill material 22 carried in the hopper 12 can therein tilt the hopper 12 one direction or the other by rotating the hopper 12 on the hopper axil 46 to an infinite number of different positions between the position of the hopper on level ground normal to the vehicle chassis 16 and the maximum radius or degree of rotation of the container on the hopper axil 46. By changing the angle of the hopper 12 from a position normal to the chassis 16, the operator changes the center of gravity of the entire vehicle 18 since the force of the mass of the hopper is imparted to the vehicle 18 at the connection point where the chassis 16 provides the mount for the hopper axil 46. By altering the angle of the hopper 12, the operator is able to traverse road surfaces of much greater incline than can be achieved without the means for altering the vehicle's center of gravity. Such an ability allows the operator to use the vehicle 18 without fear of roll over that would occur in vehicles without this ability to change the center of gravity.

While the best mode of the device herein disclosed is as a single unit with the hopper 12 having a means to adjust the center of gravity of the attached vehicle 13 and combined with the flow director 14 mounted to the end of the conveyor 20, it is possible that the flow director could be made attachable to existing conveyors already in use and such a use is anticipated. Attaching the flow director to existing conveyors which lack any means to bifurcate or control the volume of material being deposited would significantly enhance such devices.

Consequently the flow director 14 can be configured with a means of attachment to a conventional conveyor already in use to provide the utility described above and to thereby increase the effectiveness, accuracy and speed of such conventional conveyors in depositing fill material on designated targets. Such a use is anticipated due to the huge increase in utility attaching the flow director 14 by itself to retrofit existing conveyors and conveyor systems on such vehicles currently in use.

Figure 6:
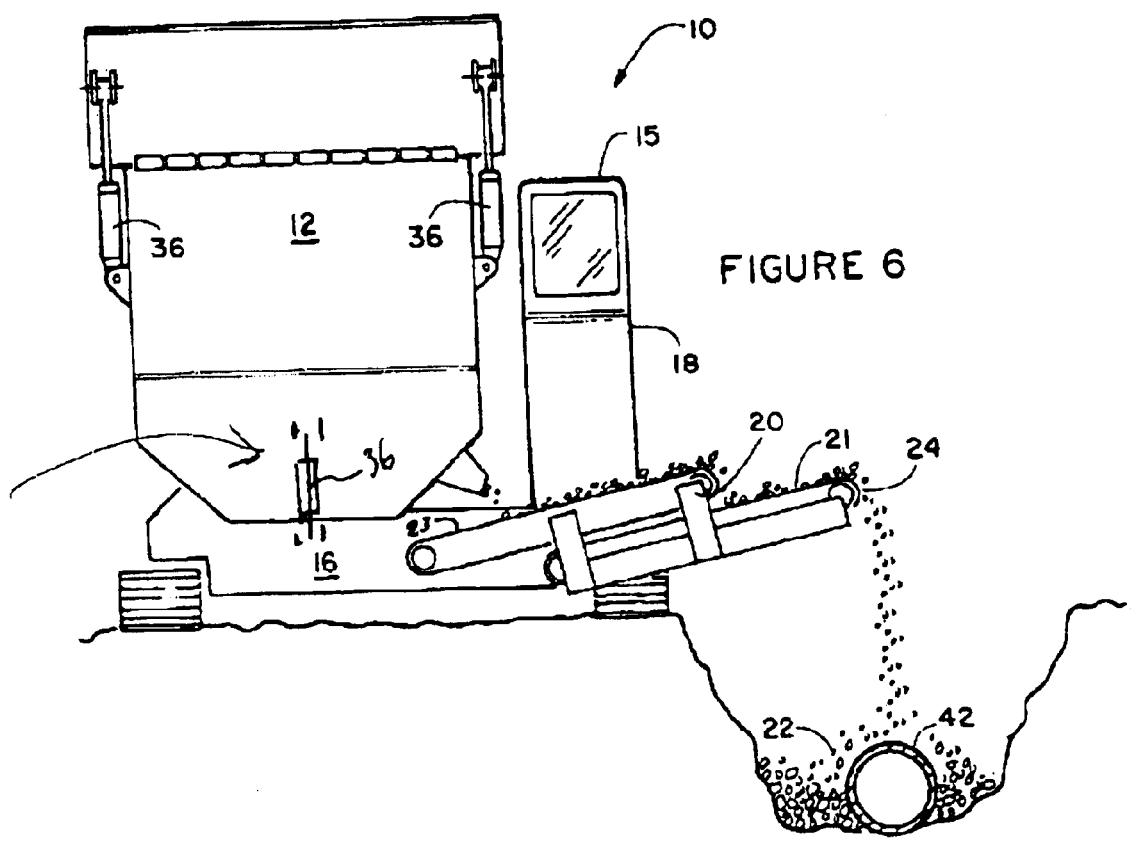
FIG. 6 depicts and additional preferred embodiment of the device with fixed or extendable conveyors which can be positioned to deposit fill when a bifurcated material stream is not needed and with a conveyor that can optionally be raised or lowered.

FIG. 6 depicts and additional preferred embodiment of the device which takes advantage of the extendable conveyors 20 which as noted working in the conventional fashion of a conveyor belt and convey fill material 22 communicated from the hopper 12 at the receiving end 23 and transport the fill material 22 on a rotating belt 21 to the distal end 24 of the conveyor 20. The belt 21 would be powered by a conventional means for powering the rotation of the belt such as a hydraulicly powered motor or electric motor. The distal end 24 of the conveyer 20 in this case would not have the flow director 14 and would deposit the material 22 on top of or on the adjacent sides of the pipe 42 or other structure in the trench to be buried. This embodiment, while not yielding all of the benefits of the embodiment with the flow director 14 does offer a substantial improvement over the conventional manner of filling a trench which involves the use of a mechanical shovel or backhoe which picks up buckets of dirt or fill material 22 and simply drops it in the trench.

Another preferred embodiment of FIG. 6 while simpler in nature, still provides a vast improvement over the current method of backhoes and piles of dirt. In this embodiment, the conveyor 20 would have first and second conveyor belts 21 with the distal end 24 being laterally translateable in relation to the receiving end 23 which would receive material from the vehicle mounted and adjustable hopper 12 thereby providing a means to telescope the conveyer 20 to longer or shorter lengths to position the distal end 24 over the area to be filled. Thus, the second conveyer belt 21 would receive fill material 22 from the first conveyor belt 21 deposited there from the hopper 12 on the receiving end 23. The second conveyor belt 21 of the conveyor 20 would render the distal end 24 user positionable over the center or sides of the trench by laterally translating the distal end 24 to the appropriate position to deposit fill material 22 in the desired location. This lateral translation of the second conveyor belt 21 under the first conveyor belt 21 would be accomplished using hydraulic cylinders 36 or similar conventional means. Of course the conveyor 20 might be comprised of a single conveyor belt 21 which could laterally translate, the current best mode features a pair of conveyor belts 21 with the distal end 24 being on the conveyor belt 21 furthest from the hopper 12 and being laterally translateable. Optionally, the distal end 24 would also be adjustable for elevation using a means for adjustment of the elevation of the distal end 24 in the form of a conventional hydraulic cylinder 36 or similar controllable extension device to adust the height of the distal end 24 above the trench by rotating the entire conveyor 20 at its connection below hopper 12 on the chassis 16.

The conveyor 20, using the vehicle mounted hopper 12 which itself is adjustable as noted above as a means to change the center of gravity of the vehicle for inclines, and the speed of the conveyor belts 21, as well as the elevation of the distal end 24 and the laterally translated position of the distal end 24, can all be combined and adjusted by the user to place the fill material 22 in the desired position in the trench. Thus, use of the telescoping or single piece conveyor 20, and optional elevation adjustment thereof, attached to the tiltable vehicle mounted hopper 12, provides a major increase in utility of trench filling over the aforementioned conventional manner of placing fill material 22 in a trench using a backhoe or similar shovel device.

While all of the fundamental characteristics and features of the self propelled backfilling apparatus with controllable steering of fill material stream invention have been shown and described, it should be understood that various substitutions, modifications, and variations may be made by those skilled in the art without departing from the spirit or scope of the invention. Consequently, all such modifications and variations are included within the scope of the invention as defined by the following claims.

What is claimed is:

1. A vehicle for transport and placement of an on board supply of fill material, comprising:

a hopper connected to a chassis of said vehicle at an attachment point, said attachment point at a center section of said chassis between a front and rear of said chassis, said hopper having discharge aperture operatively positioned to discharge a stream of fill material contained in said hopper, onto a conveyor;

means for tilting said hopper about said attachment point between a rearward angle substantially toward said rear of said chassis and a forward angle substantially toward said front of said chassis thereby providing a means for adjusting the center of gravity of said vehicle;

said conveyor having a support structure attached to said chassis, a conveyor belt, a receiving end adjacent to said hopper, a distal end opposite said receiving end, a means for powering rotation of said belt; and whereby said stream of fill material transported by said conveyor from said hopper may be adjustably deposited onto a selected target position by repositioning said distal end.

2. The vehicle for transport and placement of an on board supply of fill material of claim 1 wherein said conveyor is telescopic.

3. The vehicle for transport and placement of an on board supply of fill material of claim 1 wherein said means for tilting said hopper about said attachment point thereby providing said means for adjustment of the center of gravity of said vehicle comprises: said hopper rotationally attached at said attachment point to said vehicle using an axil; and means for rotation of said hopper on said axil whereby said fill hopper may be tilted by remote control between said rearward angle and said forward angle.

4. The vehicle for transport and placement of an on board supply of fill material of claim 1 additionally comprising: means for adjustment of the elevation of the distal end.

5. The vehicle for transport and placement of an on board SU supply of fill material of claim 2 additionally comprising: means for adjustment of the elevation of the distal end.

6. The vehicle for transport and placement of an on board supply of fill material of claim 3 additionally comprising: means for adjustment of the elevation of the distal end.

* * * * *